3,265,630
ENCAPSULATING LIPOPHILIC MATERIAL
BY COACERVATION
Erik H. Jensen, Kalamazoo Township, Kalamazoo County, Mich., assignor, by mesne assignments, to The National Cash Register Company, Dayton, Ohio, a corporation of Maryland
No Drawing.  Filed Dec. 22, 1958, Ser. No. 781,923
9 Claims.  (Cl. 252—316)

This invention relates to a novel article of manufacture, more particularly to finely divided encapsulated lipophilic material whose mantle comprises a gelable colloid and a styrene-maleic acid copolymer and to a process for the production thereof.

According to this invention, a finely divided encapsulated lipophilic material whose mantle comprises a gelable colloid and a styrene-maleic acid copolymer is prepared by a process which includes the steps of (1) bringing together, in the presence of dispersed lipophilic material, a solution of an electrophoretically chargeable styrene-maleic acid copolymer and a solution of an oppositely chargeable gelable colloid at a temperature above the gelation temperature of the colloid and at a pH at which the copolymer is electrophoretically charged and the colloid is oppositely charged and at which significant liquid-liquid phase separation of the copolymer and colloid occurs, thereby inducing encapsulation of the lipophilic material with a mantle of copolymer and colloid and (2) setting the mantle by at least one of the steps of (a) cooling the mixture below the gelation temperature of the colloid, (b) mixing the encapsulated product with a highly active carbonyl compound and (3) maintaining the encapsulated product at a temperature above the gelation temperature of the colloid until the mantle becomes set, thereby producing isolable encapsulated lipophilic material.

In U.S. 2,800,457, there is described a coacervation process in which the coacervation is accomplished with two different hydrophilic colloid materials having opposite electric charges, e.g., gelatin, albumen, alginates, such as sodium alginate, casein, agar-agar; starch, pectins, carboxy-methylcellulose, Irish moss, and gum arabic. The process of this invention is similar to the patented process in its use of a positively electrophoretically charged (below its isoelectric point) gelable colloid such as, for example, gelatin. However, we have now found that a superior product can be obtained if the electrophoretically charged material employed having a charge opposite that of the gelable colloid is a styrene-maleic acid copolymer as defined hereinafter. For example, the resulting mantle is, to a certain extent, self-hardening, thus eliminating or markedly reducing the amount of induced hardening required to produce an isolable encapsulated product with a fixed mantle. Furthermore, the gelation step can be eliminated when the natural hardening is augmented by a hardening step, e.g., with formaldehyde, pyruvic aldehyde or other highly reactive carbonyl compound as described more fully hereinafter. The permeability of the mantle of the encapsulated product produced according to the present invention is less than that of the same type of mantle produced by the above-described patented process using a different negatively charged polymer, thus reducing the degree of decomposition of unstable encapsulated material by air, moisture or another ingredient in a mixture comprising the encapsulated product which is incompatible or in any way chemically reactive therewith.

The term styrene-maleic acid copolymer, when used to describe this invention, describes those copolymers having both styrene and maleic acid polymer units, including the hydrolyzed styrene-maleic anhydride copolymers the anhydride groups of which are preferably at least 50% hydrolyzed. The copolymer can also contain other polymer units in less than majority amounts, e.g., those derived from acrylonitrile, acrylic acid, methacrylic acid, itaconic acid, ethyl vinyl ether, methyl vinyl ether, vinyl chloride, vinylidene chloride, etc., and the like. As used in the present specification, the term hydrolyzed styrene-maleic anhydride copolymer is meant to include these modifications as well as other modifications in the structure and method of preparation which do not alter the essential lipophilic and hydrophilic properties of the copolymer.

The styrene-maleic acid copolymers of the present invention can be represented by the following formula:

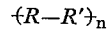

wherein R represents lipophilic polymer units of which more than 70% are styrene residues, the other ethylenic residues, when present, being those of, e.g., acrylonitrile, acrylic acid, methacrylic acid, itaconic acid, vinyl chloride, vinylidene chloride, and the like, and R' represents hydrophilic polymer units of which more than 50% are maleic acid residues, preferably more than 70%, with the ratio of R to R' being from 1:1 to about 4:1 preferably from 1:1 to about 1.2:1, and $n$ is an integer from about 90 to about 1000. The average molecular weight of the copolymer ranges preferably from about 20,000 to about 200,000.

The copolymers employed in this invention are well known in the art. For example, styrene-maleic anhydride copolymer, which is readily hydrolyzable to styrene-maleic acid copolymer, is a commercially available compound. Resin SC-2 is available from the Monsanto Chemical Company and is a modified styrene-maleic anhydride copolymer. These copolymers are hydrolyzed to obtain a styrene-maleic acid copolymer which is useful as material in the present invention. The hydrolysis, which can be partial or complete, involves a conversion of the acid anhydride linkages to α-dicarboxylic acid units. It is preferred that the hydrolysis be substantially complete, i.e., more than about 50% complete.

E. I. du Pont de Nemours and Company (Grasselli Chemicals Department) sells a product called "G-942" Tanning Agent, which is a partial sodium salt of a hydrolyzed styrene-maleic anhydride copolymer in a 25% water solution. This solution can be used as such or in the free acid form which can be obtained by precipitation with acid, e.g., hydrochloric or sulfuric acid, washing the precipitate with water, and drying the product in an oven at 60° C. or in vacuo at room temperature.

Between pH 1 and 2.5 (the pH found in a normal stomach) a styrene-maleic acid copolymer as defined herein is only 0 to 1% ionized and thus is insoluble at this pH, making the mantle produced from this copolymer and a colloid as defined herein a useful enteric mantle for oral products whose active ingredient is most efficaciously utilized when absorbed in the intestines rather than the stomach.

*Definitions.*—When employed to describe the instantly claimed process, the following terms are defined as follows:

"Finely divided" means consisting essentially of small particles, e.g., a particle size of less than 2 mm. and preferably from about 0.5 to 200 microns;

"Lipophilic" means having a relatively strong attraction for low dielectric constant, relatively non-polar media, e.g., fat or oil-like in character and substantially insoluble in the aqueous mixture employed;

"Mantle" means the film-like coating of copolymer and colloid which envelops the lipophilic material;

"Gelable" means that a solution thereof is capable, on cooling, of setting into a gel;

"Dispersion" means evenly distributed, either as an emulsion or a suspension of solids, preferably so that the particle size is smaller than 2 mm., e.g., from about 0.5 to about 200 microns;

"Aqueous" means comprising significant, e.g., 50–100% water;

"Solution" means both a true solution and a colloidal sol;

"Electrophoretically chargeable" means that the material has an electrophoretic charge at some pH;

"Oppositely electrophoretically chargeable" means that the material, while not necessarily charged oppositely from the styrene-maleic acid copolymer at the pH of the starting solution, has an opposite, and preferably an equal and opposite, charge at some pH;

"Liquid-liquid phase separation" defines the process by which some or all of the copolymer and colloid in solution separate as a mixed liquid therefrom;

"Encapsulation" means the process whereby the lipophilic particles are coated with a mantle of copolymer and colloid;

"Hardening the mantle" means the process whereby the mobile mantle initially produced in the encapsulating process is immobilized by physical or chemical means so as to produce an isolable product;

"Highly active carbonyl compound" means a ketone or aldehyde whose carbonyl group is polarized by electron donating, adjacent electronegative groupings, i.e., is more reactive than an aldehydic or keto group in an aliphatic hydrocarbon.

The novel encapsulated product of this invention is valuable as an article of manufacture in widely diversified fields. It is useful wherever a lipophilic liquid, with or without other ingredients dissolved therein, is more readily handled temporarily as a solid or the properties of a lipophilic solid are enhanced by the protective mantle of a polymer as herein defined. For example, the instant product can be employed in the printing art in the same manner as the coacervates described in U.S. 2,800,457 and 2,800,458 where a pressure-sensitive, reproducing film, e.g., on paper, plastic, cloth or wood, or a dry ink or dye, is desired which is nonstaining in ordinary handling. It may be used as a storage form of readily oxidizable or light sensitive hypophilic material or to maintain otherwise incompatible mixtures, the encapsulated material being freed when needed by crushing, milling or by reversing the encapsulating process. The encapsulated product finds use in the even dispersing of lipophilic material onto films or sheets, the dry encapsulated material providing an excellent medium for handling otherwise sticky, oily, greasy, staining or unstable lipophilic material. In the lipophilic encapsulated material can be incorporated magnetic or magnetizable particles, e.g., to be used in the "memory" or information storage devices well known in the computer, indexing, television and tape recording arts. Alternatively, materials which are predictably altered by light, high frequency radiation, electronic bombardment or an electrical or magnetic field may be incorporated for use, for example, in the photographic and recording arts. The encapsulated product of this invention finds use in the soap art, where a super-fatted soap is desired or one containing an otherwise unstable antiseptic or antibiotic, the encapsulated product being produced with a fragile mantle that breaks on manipulation; in the fertilizer, plant hormone, insecticide, antifungal, antibacterial and antiparasiticidal arts, where a slow-release product is desired or one that is not immediately washed away by precipitation; in the adhesive field, e.g., for pressure sensitive tapes and labels or anticreeping adhesives; in the catalyst art where it is desirable to store the catalizable material with the catalyst until the desired reaction is to take place, e.g., by removing the polymer mantle by breaking or heating or by chemical means, e.g., by adding a solvent for the copolymer, or otherwise reversing the encapsulating process.

The product of this invention can be used for human consumption by employing a nontoxic, i.e., in the amount consumed, polymer and lipophilic material. Thus oily products, e.g., vitamins or edible vegetable, mineral or animal fats and oils, can be consumed per se in a dry state, maintained in a more stable state and/or incorporated in products where these edible oils or vitamins would otherwise produce an objectionable taste, texture or color or would be unstable. For example, vitamins or fats can thus be incorporated in dry cereals, margarine, ice creams, butter, milk or other dairy products, in fruits, vegetables and their juices, e.g., frozen orange juice, bread and other baked goods, jams and other condiments, or for maintaining unstable flavorings, the mantle being broken in cooking or mixing.

The encapsulated lipophilic material can have medicaments contained therein, vitamins or other diet supplements making the encapsulated product of this invention very useful in the pharmaceutical field. Thus, products having sustained action can be produced; oral products can be prepared in which gastric irritation and/or drug destruction in the stomach is reduced; objectionable taste and/or odor can be reduced or eliminated; liquid preparations can be converted to dry products, stability of pharmaceuticals can be increased by preventing oxidative, hydrolytic or photolytic degradation of the drugs; more versatile formulation thereof can be achieved by separating incompatibles or producing stable emulsions, etc.; absorption characteristics of the active ingredient can be improved; preparations can be formulated in which one or more ingredient is encapsulated and thus protected until used and then liberated by rubbing or otherwise physically rupturing the mantle, e.g., in lotions, creams, ointments, chewable tablets or gum.

Lipophilic materials which are encapsulated in this invention include the animal and vegetable fats, e.g., hydrogenated cottonseed, soybean and peanut oils, butter, lard, beef fat and lanolin, the animal, vegetable and mineral oils, e.g., cottonseed, soybean, peanut, corn and coconut oil; the waxes and wax-like solids, e.g., carnauba, soybean and corn waxes, paraffin, soysterols, cholesterol, ergosterol, and any other liquid or solid lipophilic material which is substantially insoluble in the aqueous solution employed in the process of this invention.

Aqueous solutions of the polymer which can be employed in the process of this invention include water solutions and homogeneous aqueous solvent mixtures which comprise water and, e.g., the lower-alkanols, especially methanol and ethanol, the lower alkylene glycols, especially ethylene glycol, propylene glycol and trimethylene glycol, the lower-alkyl triols, especially glycerol, and mixtures of the above. As will be noted from the above, preferred are water and aqueous mixtures of low-molecular weight, water-miscible hydroxy compounds.

The glycols and triols as defined above are also useful additives to prevent coalescence of the encapsulated product and to produce a product having superior handling properties. Examples of other anticoalescing agents are the polyethylene glycols, 200 to 600.

In preparing an encapsulated product of this invention, the selected styrene-maleic acid copolymer is dissolved in water or an aqueous mixture of solvents. Whether a true solution or a colloidal sol is obtained depends, in part, upon the molecular size of the selected copolymer. However, the exact character of the resulting solution is immaterial to the outcome of the process. The solubility of the copolymers employed in this invention vary considerably in the various aqueous liquids. For example, completely hydrolyzed styrene-maleic anhydride polymer is about 2% soluble in water but at least 20% soluble in a 50:50 mixture of methanol and water. Thus, solutions of the desired polymer can be prepared in relatively dilute form in water alone. Alternatively, the concentration of the polymer can be increased by the addition of a solubilizing agent, e.g., another hydrophilic liquid such as, for example, methanol or ethanol.

Another type of solubilizing agent useful when carboxylic acid polymers are empoyed are the polysaccharides, e.g., alginates, pectins, methylcellulose, carboxymethylcellulose, etc. Of particular usefulness are the galactose polysaccharides, e.g., derived from Irish moss (carrageen), available as SeaKem, Type No. 1, from Seaplant Chemical Corporation, New Bedford, Massachusetts. For example, the solubility of completely hydrolyzed styrene-maleic anhydride copolymer in water can be raised from about 2% to about 7 to 10% in the presence of relatively small amounts of this polysaccharide, e.g., one part to four parts of the copolymer. Higher concentrations of the acid polymers can also be achieved by passing a solution of an alkali-metal salt thereof through a bed of sulfonic acid ion exchange resin, e.g., Dowex 50.

A solution of the selected colloid, e.g., gelatin, albumin, casein, polybasic polymers, e.g., deacetylated chitin, sometimes called chitosans, polyvinylpyrrolidone, the copolymer produced from polyvinylpyridine and styrene, or from triethanolamine and phthalic acid, and polyamino acids, e.g., polylysine, polyornithine and poly-p-aminophenylaniline, is also prepared.

The process of this invention involves the bringing together of a solution of the styrene-maleic acid copolymer and a solution of the gelable colloid under conditions which produce significant liquid-liquid phase separation of the copolymer and colloid. This can be accomplished by making separate solutions of the copolymer and colloid and then bringing them together at a pH at which liquid-liquid phase separation occurs or, alternatively, making a mixed solution of the copolymer and the colloid at a pH at which significant liquid-liquid phase separation does not occur and thereafter adjusting the pH with acid or base until material liquid-liquid phase separation does occur. The latter technique is ordinarily preferred as coalescence and aggregation, which ordinarily is not desirable in large amounts, often occurs in substantial amounts when separate solutions of the copolymer and the colloid are mixed at a pH at which a significant amount of liquid-liquid phase separation occurs, although this can be avoided to a certain extent by a slow addition with high speed mixing. The correct or optimum pH to be employed when inducing liquid-liquid phase separation can readily be determined in the absence of lipophilic material by preparing a mixed solution of the selected colloid and copolymer at a pH at which no material amount of cloudiness, i.e., liquid-liquid phase separation, occurs and then adjusting the pH until a material amount of cloudiness is produced. The maximum liquid-liquid phase separation ordinarily occurs when the copolymer and gelable colloid have electrophoretic charges which are equal and opposite.

The pH adjustment may require the addition of acid or base, e.g., mineral or organic acid or alkali-metal alkoxide or organic, e.g., pyridine, base, depending upon pH of the copolymer and colloid solutions and the pH required to produce liquid-liquid phase separation. For example, styrene-maleic acid copolymer and gelatin solution must be mixed with base, e.g., to a pH of about 7 or above, to prevent phase separation.

In the process of this invention, the liquid-liquid phase separation is induced in the presence of dispersed lipophilic material. The colloid-copolymer rich phase coats the lipophilic particles, thereby encapsulating them with a mantle of copolymer and colloid.

The lipophilic material can be mixed with the colloid and polymer solution in several ways. For example, if the colloid and copolymer solutions are prepared separately, the lipophilic material can be dispersed in either or both of these solutions. If a very small particle size is desired, the solution containing the suspended lipophilic material can be passed through a homogenizer or a colloid mill. A high speed mixer, e.g., a Waring Blendor, can produce finely particled suspensions or emulsions. Similarly, if the colloid and polymer are dissolved in the same solution, by appropriate adjustment of the pH thereof, the lipophilic material can be dispersed in this solution. A further alternative is to prepare a separate suspension or emulsion, preferably in the same solvent system as employed to prepare the copolymer and colloid solutions, and mix them thereafter.

It can thus be seen that the starting mixture of the liquid-liquid phase separation step of this invention can be prepared by (1) dispersing the lipophilic material in either or both of the separate solutions of the colloid and copolymer and then mixing the two mixtures at a pH at which significant phase separation does not occur, (2) preparing the above dispersion at such a pH that when the separate solutions are combined phase separation occurs, (3) preparing a separate dispersion of the lipophilic material and then mixing the dispersion with either or both of the separate solutions of the colloid and copolymer, (4) dispersing the lipophilic material in a mixed solution of the colloid and copolymer, maintained at a pH at which significant phase separation does not occur, and (5) preparing a separate dispersion of the lipophilic material and then mixing the dispersion with a mixed solution of the colloid and copolymer, maintained as described above. As stated above, the preferred procedure involves dispersing the lipophilic material in a mixed solution of the copolymer and colloid and then adjusting the pH of the mixture until phase separation occurs.

In the presence of the dispersed lipophilic material, the copolymer and colloid rich phase coats the lipophilic particles, forming a mantle thereover, thus producing the encapsulated product of this invention. The thickness of the mantle can, within limits, be controlled by the ratio of lipophilic material to copolymer. Thus, if a thicker mantle is desired, more colloid and copolymer should be employed. As is apparent, the smaller the particle size of the lipophilic material, the greater the total surface area per unit weight, thus requiring larger amounts of copolymer in order to achieve the same mantle thickness as that obtained when employing the same weight of lipophilic material of larger particle size.

At this stage, the mantle is ordinarily still quite mobile and not amenable to isolation. The next step of the process involves the setting of the thus-produced mobile mantle. The mantle is self-setting and will produce a stable mantle upon standing, preferably from 30 minutes to several hours or days, at a temperature above the gelation temperature of the colloid. The time required to set the mantle in this manner can be determined by removing portions of the encapsulated product from time to time and determining by manipulation whether or not the mantle is stable above the gelation temperature of the colloid, e.g., filtering while hot and drying at 60° C.

Alternatively or additionally, agent or agents can be added to the total mixture containing the encapsulated product which will react chemically with the colloid in the mantle, thereby setting the mantle, e.g., suspending the encapsulated product for 15 minutes in 10% aqueous ferric chloride or 10% tannic acid in isopropyl alcohol, or in 10% aqueous ferric chloride for 15 minutes at room temperature and then in 20% tannic acid in glycerine. Preferred are the highly active carbonyl compounds, especially those having from one to 8 carbon atoms, inclusive. Examples of these are formaldehyde, glyoxal, phenylglyoxal, malonic acid dialdehyde, pyruvaldehyde, glyceraldehyde, diacetyl and methyl phenyl ketone. Heating will sometimes accelerate this setting process, but care should be taken not to disrupt the still mobile mantle.

Alternatively or additionally, the encapsulated product can also be set by exposure to reagents which will chemically alter the surface groups of the copolymer in the mantle, e.g., the polymer can be reacted with a monomer to produce cross-linking, when the structure of the polymer permits, or irradiated, e.g., with high velocity electron bombardment, e.g., with a Van de Graaff electrogenerator, to change the molecular structure of the monomer and, desirably to concomitantly sterilize the encapsulated lipophilic material.

Alternatively or additionally, the mantle can be hardened by chilling the reaction mixture below the gelation temperature of the colloid, e.g., in the manner described in U.S. 2,800,457. For practical reasons, this step is usually used singly or in combination with one of the other techniques described above to set the mantle. The cooling can be rapid or slow, but as is now known, the permeability of the thus-produced mantle is sometimes affected by the cooling rate. Usually a very rapid cooling from the working temperature to below 10° C., e.g., 4° C., in about 20 to 40 minutes, is desired. More rapid or slower cooling usually produces an increase in permeability.

Any of the above setting techniques can be employed singly to set the mantle of the encapsulated product. The other setting techniques may thereafter be employed to further harden the mantle, e.g., to produce a more impermeable mantle.

The thus-produced encapsulated product can be isolated by centrifugation or filtration to remove the aqueous liquid and then, if desired, washing the encapsulated material thoroughly, e.g., with water or another liquid in which the polymer is only slightly soluble, e.g., dilute acetic acid, and dried, e.g., freeze or spray dried. Alternatively, the total reaction product can be freeze or spray dried and, if desired, then washed to remove any material occluded on the mantle. Other isolation details are described in U.S. 2,800,457.

The following preparation and examples are illustrative of the composition, article and process of the present invention but are not to be construed as limiting.

PREPARATION 1

Add with thorough mixing one liter of C.P. sulfuric acid slowly to 20 kg. of a 25% w./w. aqueous solution of the half sodium salt of styrene-maleic acid copolymer (Du Pont G-942 Tanning Agent). Stir for one-half hour and then dilute with five gallons of deionized water. Stir for another one-half hour and separate by centrifugation. Slurry the solids with five gallons of deionized water and centrifuge. Dry the solids in an air dryer for 120 hours at 35° C. Grind to a coarse powder in a mill. Complete the drying in an air dryer at 35° C. for an additional 49 hours. An almost quantitative yield of styrene-maleic acid copolymer is obtained.

Table I gives further data on various preparations of the copolymers of the present invention by hydrolysis of the corresponding styrene-maleic anhydride copolymers. By varying the degree of agitation, batch size, temperature of the water and heating time, various degrees of hydrolysis can be obtained. Hydrolysis can also be carried out by use of alkali as indicated in the table.

TABLE I.—HYDROLYSIS OF STYRENE-MALEIC ANHYDRIDE COPOLYMER (SY-M) AND RESIN SC-2

| | Hydrolysis Conditions | Drying Conditions | Wt. of Starting Material | Percent Water | Percent Anhydride |
|---|---|---|---|---|---|
| | | | Wt. of Product (gms.) | | Percent Dicarboxylic Acid |
| A | 1,011 gm. SY-M in 5.5 gallons of 2.5% sodium hydroxide was heated at 60-70° C. for five hours. Dilute hydrochloric acid was then added dropwise with stirring until the pH had dropped to about pH 3. The precipitated copolymer was recovered by vacuum filtration. | 120 hours at 25° C. in vacuo | 1,011 (SY-M) | 8.22 | 0 |
| | | | 1,100 | | 100 |
| B | 1 kg. Resin SC-2 added to 10 l. of 2% aqueous solution of sodium hydroxide. After 1½ hrs. stirring, pH was 7.00. Product precipitated with dilute hydrochloric acid. | Low-humidity oven at 60° C. for 41 hours. | 1,000 (Resin SC-2) | | <5 |
| | | | 875 | | >95 |
| C | 4% suspension in water heated for 2 days at 60°-5° C. with vigorous stirring. | Freeze-dried with shelf temperature not above 26° C. (80° F.). | 250 (SY-M) | | <5 |
| | | | | | >95 |
| D | ibid | ibid | 1,000 (SY-M) | 4.07 | 10 |
| | | | 948 | | 90 |
| E | ibid | In vacuo at 20° C | 3,000 (SY-M) | 10.6 | 20 |
| | | | 3300 | | 80 |
| | | Further 7 days at 38.3° C. 10% relative humidity. | | 7.36 | 20 |
| | | | | | 80 |
| | | Further 3 days at 60° C. air-circulating oven. | | 4.26 | 20 |
| | | | | | 80 |
| F | ibid | 60° C. in air-circulating oven | 4,536 (SY-M) | 1.65 | 30 |
| | | | 4,560 | | 70 |
| G | 2 kg. Resin SC-2 heated with stirring in 2.5 gallons water at 100° C. for 5.25 hours. | 6 days at 38° C., 10% relative humidity. | 2,000 (Resin SC-2) | | <50 |
| | | | 1,640 | | >50 |
| H | 200 gm. "Stymer S" (Monsanto: Partial sodium salt of Resin SC-2) dissolved in 2 l. water at 80° C. with stirring. Dilute hydrochloric acid added dropwise with stirring to precipitate the hydrolyzed Resin SC-2. Latter washed by decantation and dried. | 89 hours at 60° C | 200 (Stymer S) | | <50 |
| | | | 117 | | >50 |

*Example 1*

Mix 20 g. of styrene-maleic acid copolymer (Preparation 1), and 5 g. of SeaKem, Type No. 1, and disperse the mixture in 100 ml. of propylene glycol. Add 500 ml. of water and heat to 80° C. Heat 50 ml. of Vitamin A oil to 80° C. and emulsify the oil into the copolymer solution with a homogenizer. Disperse 20 g. of gelatin in 100 ml. of water, heat to 80° C. and add the gelatin sol dropwise to the emulsion. Maintain the mixture at 80° C. with stirring for 15 minutes and then cool to 4° C. over a period of 30 minutes. Keep at 4° C. for one hour and then add 20 ml. of 37% aqueous formaldehyde followed by sufficient 10% aqueous sodium hydroxide to raise the pH to 8.0. Maintain the mixture for 1 hour at 4° C. and separate the solids by centrifugation. Resuspend the solids in 1% hydrochloric acid and then dry.

*Example 2*

Disperse 20 g. of gelatin in 100 ml. of water and heat on a steam bath until dissolved. Add 200 ml. of propylene glycol followed by 125 g. of white mineral oil. Emulsify the mixture in a colloid mill until the size of the droplets is below 10 microns. Mix 20 g. of SeaKem, Type No. 1, Irish moss extractive, with 20 g. of styrene-maleic acid copolymer (Preparation 1) and disperse the mixture in 100 ml. of water. Add 100 ml. of 1.0 N sodium hydroxide and heat the mixture on a steam bath until dissolved. To the solution add 200 ml. of propylene glycol. At 50° C., slowly add the copolymer solution to the oil emulsion. To this mixture slowly add dropwise with stirring at 50° C. a sufficient amount of a mixture of 50 ml. of 1.0 N hydrochloric acid, 50 ml. of water and 100 ml. of propylene glycol to bring the pH of the copolymer-gelatin-oil mixture to 4.90, as determined on an aliquot portion at room temperature. Maintain the stirred mixture at 50° C. for 0.5 hour and then add 25 ml. of pyruvic aldehyde. Stir for an additional 5 minutes and then pour the mixture over about one liter of ice. Add enough 0.1 N sodium hydroxide to adjust the pH to 7.0 and maintain overnight at room temperature. Separate the encapsulated product by centrifugation, resuspend in one liter of water and spray dry.

The following variations, or combinations thereof, can be made in the process described in Example 2: The amount of propylene glycol is reduced so as to constitute only 10% of the solvent volume; the SeaKem is eliminated and the amount of water increased to 1,250 ml.; the treatment with pyruvic aldehyde is eliminated and the mixture instead poured slowly into a large volume of ice water; the mixture, after treatment with pyruvic aldehyde, is heated for one hour at 80° C. and the still hot mixture centrifuged to isolate the encapsulated product; glyoxal is substituted for the pyruvic aldehyde; formaldehyde is substituted for the pyruvic aldehyde; glycerine is substituted for the propylene glycol; the pyruvic aldehyde treatment is eliminated; the pyruvic aldehyde treatment is eliminated and the isolated encapsulated lipophilic material is stirred thoroughly with dilute acetic acid; peanut oil is substituted for the mineral oil.

What is claimed is:

1. A process for the production by coacervation of finely divided encapsulated solid lipophilic material which comprises: (1) intermixing the solid lipophilic material to be encapsulated, an aqueous solution of a gelable colloid and an aqueous solution of a styrene maleic acid copolymer, at a pH at which the said gelable colloid and copolymer are oppositely charged and at a temperature above the gelation temperature of the said gelable colloid, whereupon a liquid phase rich in the said gelable colloid and copolymer separates from a liquid phase poor in said components, the said rich liquid phase encapsulating the lipophilic particles, and (2) setting the encapsulating mantle.

2. The process of claim 1 wherein the styrene maleic acid copolymer consists of styrene and maleic acid polymer units and the gelable colloid is gelatin.

3. The process of claim 2 wherein the mantle is set by cooling below the gelation temperature of the gelatin.

4. A process for the production of coacervation of a finely divided encapsulated solid lipophilic material which comprises: (1) dispersing the solid lipophilic material in an aqueous solution of styrene maleic acid copolymer and gelatin, at a pH above the isoelectric point of the said gelatin and a temperature above the gelation point of the said gelatin, (2) lowering the pH below the isoelectric point of the said gelatin but above the isoelectric point of the said copolymer, whereby to induce the separation of a liquid phase rich in the said gelatin and copolymer from a liquid phase poor in said components, the said rich phase encapsulating the dispersed lipophilic particles, and (3) setting the encapsulating mantle.

5. A process for the production by coacervation of finely divided encapsulated solid lipophilic material which comprises: (1) intermixing the solid lipophilic material to be encapsulated, an aqueous solution of a gelable colloid and an aqueous solution of a styrene maleic acid copolymer containing a lower alkylene glycol, at a pH at which the said gelable colloid and copolymer are oppositely charged and at a temperature above the gelation temperature of the said gelable colloid, whereupon a liquid phase rich in the said gelable colloid and copolymer separates from a liquid phase poor in said components, the said rich liquid phase encapsulating the lipophilic particles, and (2) adding to the said mixture a compound selected from the group consisting of glyoxal and formaldehyde to harden the encapsulating mantle.

6. The process of claim 5 wherein the styrene maleic acid copolymer consists of styrene and maleic acid polymer units and the gelable colloid is gelatin.

7. A process for the production by coacervation of a finely divided encapsulated solid lipophilic material which comprises: (1) dispersing the solid lipophilic material in an aqueous solution of styrene maleic acid copolymer and gelatin in the presence of an Irish moss polysaccharide and a lower alkylene glycol, at pH about 4.90 and a temperature above the gelation temperature of the said gelatin, whereby to induce the separation of a liquid phase rich in the said gelable colloid and copolymer from a liquid phase poor in said components, the said rich phase encapsulating the dipsersed lipophilic particles, (2) lowering the pH to less than about 4.90 but higher than the isoelectric point of the said copolymer, and (3) cooling the encapsulating mantle below the gelation temperature of the said gelatin.

8. The process of claim 8 wherein the encapsulating mantle is hardened by cooling the mixture of step 1 below the gelation temperature of the gelatin.

9. An article of manufacture comprising a solid lipophilic material encapsulated by a mantle consisting essentially of a complex of styrene maleic acid copolymer and gelatin.

References Cited by the Examiner

UNITED STATES PATENTS

| | | | |
|---|---|---|---|
| 2,054,903 | 9/1936 | Hagedorn | 260—41 |
| 2,800,457 | 7/1957 | Green et al. | 167—82 X |
| 2,805,977 | 9/1957 | Robinson | 167—82 |
| 2,850,395 | 9/1958 | Green | 106—22 |
| 2,897,121 | 7/1959 | Wagner | 167—82.5 |
| 2,969,330 | 1/1961 | Brynko | 252—316 |
| 2,969,331 | 1/1961 | Brynko | 252—316 |
| 3,016,308 | 1/1962 | Macaulay | 117—36.7 |
| 3,069,370 | 12/1962 | Jensen et al. | 260—23 |
| 3,081,233 | 3/1963 | Enz | 167—82 |

FOREIGN PATENTS 760,403   10/1956   Great Britain.

OTHER REFERENCES

Malek, Nature, vol. 181, March 8, 1958, pages 706–707.

LEWIS GOTTS, *Primary Examiner.*

MORRIS O. WOLK, IRVING MARCUS, *Examiners.*

R. C. MANNING, R. GRANIEWSKI, S. K. ROSE,
*Assistant Examiners.*

UNITED STATES PATENT OFFICE
CERTIFICATE OF CORRECTION

Patent No. 3,265,630 August 9, 1966

Erik H. Jensen

It is hereby certified that error appears in the above numbered patent requiring correction and that the said Letters Patent should read as corrected below.

Column 10, line 36, for "dipsersed" read -- dispersed --; column 10, line 41, for the claim reference numeral "8" read -- 7 --.

Signed and sealed this 22nd day of August 1967.

(SEAL)
Attest:

ERNEST W. SWIDER
Attesting Officer

EDWARD J. BRENNER
Commissioner of Patents